(12) United States Patent
Johnson

(10) Patent No.: US 6,777,926 B2
(45) Date of Patent: Aug. 17, 2004

(54) PHASE STABILITY OF NON-SINUSOIDAL SIGNALS UTILIZING TWO DIFFERENTIAL HALLS

(75) Inventor: Curtis B. Johnson, Freeport, IL (US)

(73) Assignee: Honeywell International Inc., Morristown, NJ (US)

( * ) Notice: Subject to any disclaimer, the term of this patent is extended or adjusted under 35 U.S.C. 154(b) by 13 days.

(21) Appl. No.: 10/211,834

(22) Filed: Aug. 2, 2002

(65) Prior Publication Data

US 2004/0021457 A1 Feb. 5, 2004

(51) Int. Cl.$^7$ .................................................. G01P 3/44
(52) U.S. Cl. .................... 324/174; 324/165; 324/173
(58) Field of Search ............................ 324/161, 173, 324/165, 174, 207.2, 207.251; 338/324; 340/672

(56) References Cited

U.S. PATENT DOCUMENTS

| | | | |
|---|---|---|---|
| 5,041,891 A | 8/1991 | Ishii | 357/27 |
| 5,218,298 A | 6/1993 | Vig | 324/251 |
| 5,241,267 A | 8/1993 | Gleixner et al. | 324/207.2 |
| 5,614,821 A | 3/1997 | Leiderer | 324/174 |
| 5,640,090 A | 6/1997 | Furuya et al. | 324/251 |
| 5,657,189 A | 8/1997 | Sandhu | 360/112 |
| 5,796,247 A | 8/1998 | Pape | 324/207.2 |
| 6,051,971 A | 4/2000 | Holden | 324/207.24 |
| 6,175,233 B1 | 1/2001 | McCurley et al. | 324/207.2 |
| 6,310,472 B1 | 10/2001 | Chass | 324/207.2 |

FOREIGN PATENT DOCUMENTS

EP 0 412 200 A1 2/1991 ........... G01P/3/487

*Primary Examiner*—Jay Patidar
(74) *Attorney, Agent, or Firm*—Kris T. Fredrick; Kermit D. Lopez; Luis Ortiz

(57) ABSTRACT

A method and apparatus for sensing the speed and direction of a rotating target is disclosed. A first differential Hall package can be generally located opposite to a second differential Hall package, wherein the first differential Hall package and second differential Hall package comprise mirror images of one another. A first output signal can then be generated by the first differential Hall package and a second output signal by the second differential Hall package during a rotation of the rotating target. The first Hall output signal can thus be compared to the second Hall output signal during a shift of the rotating target from a sinusoidal phase to a non-sinusoidal phase thereof, thereby permitting accurate phase information indicative of the speed and direction of the rotating target to be obtained.

22 Claims, 5 Drawing Sheets

PHASE STABILITY OF NON-SINUSOIDAL SIGNALS UTILIZING TWO DIFFERENTIAL HALLS

TECHNICAL FIELD

The present invention generally relates to magnetic sensors. The present invention also relates to magnetic sensors for sensing the speed and direction of a rotating target. The present invention additionally relates to differential Hall sensors. In addition, the present invention relates to sensors utilized in automotive applications, including transmission, crank/cram, and wheelspeed mechanisms thereof.

BACKGROUND OF THE INVENTION

Various sensors are known in the magnetic effect sensing arts. Examples of common magnetic effect sensors include Hall effect sensors, differential Hall sensors, and magnetoresistive sensor technologies. Such magnetic sensors can respond to the change of magnetic field as influenced by the presence or absence of a ferromagnetic target object of a designed shape passing by the sensory field of the magnetic effect sensor. The sensor can then provide an electrical output signal, which can be further modified as necessary by subsequent electronics to yield appropriate sensing and control information thereof. Associated electronics may be either onboard or outboard of the sensor package.

Geartooth sensors, for example, are known in the automotive arts to provide information to an engine controller for efficient operation of the internal combustion engine. One such known arrangement involves the placing of a ferrous target wheel on the crankshaft of the engine with the sensor located proximate thereto. The target objects, or features, i.e., tooth and slot, are, of course, properly keyed to mechanical operation of engine components. Such sensors can be configured according to the Hall effect, which is well known in the magnetic sensor arts.

The Hall effect has been known for many years. Hall effect sensors are typically based on the utilization of a Hall generator, which generally comprises a magnetic field dependent semiconductor whose function rests on the effect discovered by Edwin Hall. This effect, known as the "Hall effect," is caused by the Lorentz force, which acts on moving charge carriers in a magnetic field.

One of the first practical applications of the Hall effect was as a microwave power sensor in the 1950s. With the later development of the semiconductor industry and its increased ability for mass production, it became feasible to use Hall effect components in high volume products. In 1968, Honeywell's MICRO SWITCH division produced a solid-state keyboard using the Hall effect. The Hall effect sensing element and its associated electronic circuit are often combined in a single integrated circuit.

In its simplest form, a Hall element can be constructed from a thin sheet of conductive material with output connections perpendicular to the direction of electrical current flow. When subjected to a magnetic field, the Hall effect element responds with an output voltage that is proportional to the magnetic field strength. The combination of a Hall effect element in association with its associated signal conditioning and amplifying electronics is sometimes called a Hall effect transducer.

A comprehensive source of information about Hall effect devices is provided in a book by R. S. Popovic, entitled "Hall Effect Devices: Magnetic Sensors and Characterization of Semiconductors", published under the Adam Hilger Imprint by IOP Publishing Limited.

In the differential Hall sensor, two Hall generators may be arranged close to one another. The individual Hall generators operate along the same principle as the magnetic dependent semiconductor in single Hall effect sensors. Both Hall elements are generally biased with a permanent magnet.

Transmission manufacturers generally desire a single sensor to sense the speed and direction of a transmission mechanism. Comparing two output signals and determining which output signal leads or lags the other, with a desired phase between the two signals of approximately 90 degrees, can obtain direction information. Speed information can be obtained by monitoring an associated pulse width or period width of one of the output signals. Differential Hall analog signals often become non-sinusoidal as target features increase. Varying target rotation direction can thus cause large errors in signal phasing when comparing dual differential Hall digital outputs, because of the association non-symmetry of the analog signals. The present inventor has thus concluded, based on the foregoing, that a need exists for an apparatus and method for eliminating such errors, particularly during phase shifts from sinusoidal to non-sinusoidal phases. A unique apparatus and method for eliminating such errors is, therefore, disclosed and described herein.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is one aspect of the present invention to provide an improved sensor method and apparatus for sensing the speed and direction of a rotating target.

It is also an aspect of the present invention to provide an improved differential Hall sensor method and apparatus.

It is yet another aspect of the present invention to provide an improved sensor method and apparatus for determining the phase stability of non-sinusoidal signals utilizing two differential Hall packages.

The above and other aspects can be achieved as is now described. A method and apparatus for sensing the speed and direction of a rotating target are disclosed herein. A first differential Hall package is generally located opposite a second differential Hall package, wherein the first differential Hall package and second differential Hall package comprise mirror images of one another. The first differential Hall package generally includes two magnetic Hall elements. Similarly, the second differential Hall package generally includes two magnetic Hall elements. Such magnetic Hall elements may comprise differential Hall elements. A first output signal can is generated by the first differential Hall package, and a second output signal is generated by the second differential Hall package during a rotation of the rotating target. The first Hall output signal can thus be compared to the second Hall output signal during a shift of the rotating target from a sinusoidal phase to a non-sinusoidal phase thereof, thereby permitting accurate phase information indicative of the speed and direction of the rotating target to be obtained.

The present invention thus comprises a speed and direction sensor that generally utilizes two separate differential Hall packages, which each may be implemented as integrated circuit (IC) packages. An initial phase can be established by the distances between each of the IC packages as a function of the target and magnet placements thereof. Differential Hall analog signals become non-sinusoidal as target features increase. Changing the target rotation direction causes large errors in signal phasing when comparing dual differential Hall digital outputs because of the non-symmetry of the analog signals. To eliminate the large resulting error, IC package placement relative to one another is thus critical. By placing the IC packages in opposite directions relative to each other, the associated phase remains unaffected by the target rotation. If both IC packages are placed in the same direction, however, a large phase shift will be seen when the target rotation is varied.

The method and apparatus for placing differential Hall elements next to one another as described herein thus becomes beneficial when the Hall output (i.e., analog signal) begins to alter from a perfect sinusoidal signal. When target features are wide, for example, with respect to the target-to-sensing plane and the sensing plane-to-magnet distances, the Hall signal tends to posses areas of "leveling off" or an area of decreased slope. This area greatly impacts how the two signals optimally can be compared to one another to achieve the most accurate phase information between target rotations. The sensor method and apparatus thus disclosed herein can be utilized for any application where target direction is required, thereby yielding the best signals.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate embodiments of the present invention and are not intended to limit the scope of the invention.

The present invention generally discloses an innovative and unique method and apparatus for configuring dual differential Hall elements in a manner that minimizes phasing errors and signal distortion utilized to determine the direction and speed of a rotating target, such as, for example, transmission, wheelspeed and cam/crank mechanisms utilized in automotive applications.

Figure 1:
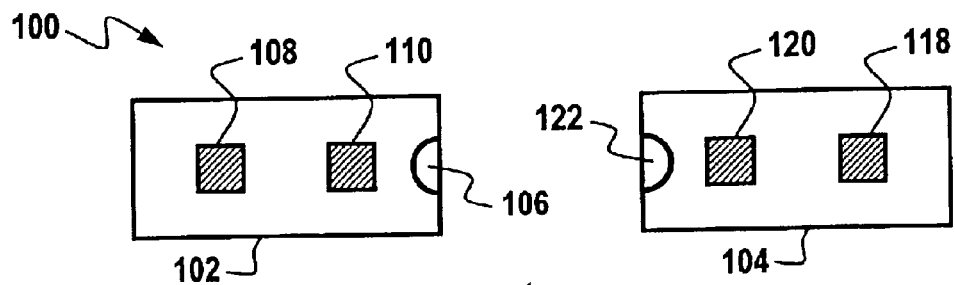
FIG. 1 depicts a block diagram illustrating a differential Hall sensor configuration in which differential Hall elements are located opposite one another, in accordance with a preferred embodiment of the present invention.

FIG. 1 depicts a block diagram illustrating a differential Hall sensor configuration 100 in which differential Hall elements 108, 110 and 120, 118 are located opposite one another (i.e., index 106 and index 122 are both facing in), in accordance with a preferred embodiment of the present invention. Differential Hall sensor configuration 100 thus includes a differential Hall IC package 102 and a differential Hall IC package 104. Differential Hall IC package 102 includes differential Hall elements 108 and 110, while differential Hall IC package 104 includes differential Hall elements 120 and 118. Differential Hall elements 108 and 118 generally comprise differential Hall elements, which can be designated "Hall1." Differential Hall elements 110 and 120 generally comprise differential Hall elements, which can be designated "Hall2". Note that the term "differential Hall package" can be utilized interchangeably with the term "differential Hall IC package."

Differential Hall IC packages 102 and 104 are thus located next to one another in opposite directions (e.g., 108 and 120 are located on the left-hand side of the IC packages). Note that differential hall elements 108, 110, 120, 118 can also be referred to as magnetic Hall elements. Thus, based on the foregoing, a differential Hall analog output signal can be determined by the formulation, Hall2-Hall1 . Thus, it can be appreciated, based on configuration 100 of FIG. 1 that larger phase errors can be eliminated, based on the critical placement of differential Hall IC packages 102 and 104 relative to one another. By placing differential Hall IC packages in opposite directions. relative to each other, as illustrated in FIG. 1, the associated phase of a rotating target is unaffected. If both differential Hall IC packages are placed in the same direction, however, a large phase shift will be seen when target rotation is altered.

Figure 2:
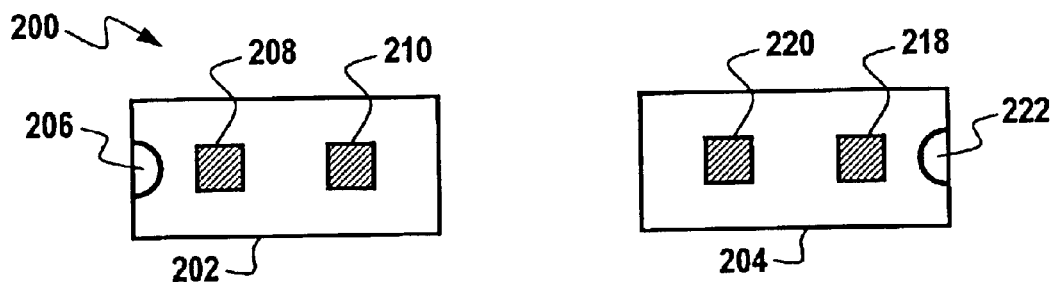
FIG. 2 depicts a block diagram illustrating a differential Hall sensor configuration in which differential Hall elements are located opposite one another, in accordance with an alternative embodiment of the present invention.

FIG. 2 depicts a block diagram illustrating a differential Hall sensor configuration 200 in which differential Hall elements 208, 210 and 220, 218 are located opposite one another (i.e., index 206 and index 222 are both facing out), in accordance with an alternative embodiment of the present invention. Differential Hall sensor configuration 200 thus includes a differential Hall IC package 202 and a differential Hall IC package 204. Differential Hall IC package 202 includes differential Hall elements 208 and 210, while differential Hall IC package 204 includes differential Hall elements 220 and 218. Differential Hall elements 210 and 220 generally comprise differential Hall elements, which can be designated "Hall1." Differential Hall elements 208 and 218 generally comprise differential Hall elements, which can be designated "Hall2"

Differential Hall IC packages 202 and 204 are thus located next to one another in opposite directions, which means that differential Hall elements 208, 210 are respectively located opposite differential Hall elements 220, 218 (e.g., 208 and 220 are located on the left-hand side of the IC packages). (The Hall IC packages 102 and 104 of FIG. 1 are each rotated 180 degrees to result in the Hall IC packages 202 and 204 shown in FIG. 2.) Note that differential hall elements 208, 210, 220 and 218 can also be referred to as magnetic Hall elements. Thus, based on the foregoing, a differential Hall analog output signal can be determined by the formulation, Hall2-Hall1, similar to the result of the configuration depicted in FIG. 1.

Figure 3:
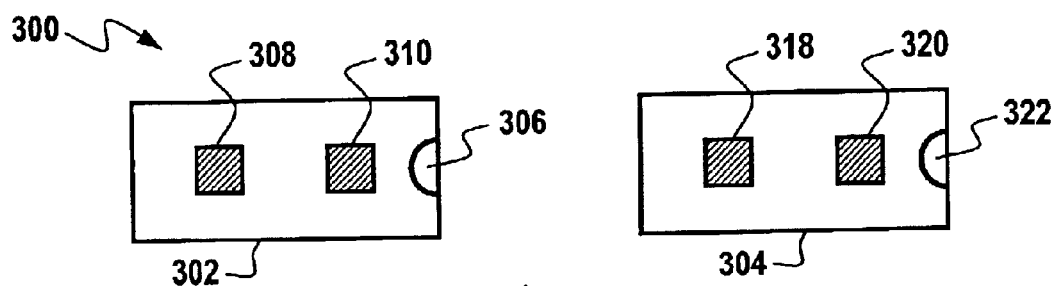
FIG. 3 depicts a block diagram illustrating a configuration of differential Hall elements facing one another in the same direction.

FIG. 3 depicts a block diagram illustrating a configuration 300 of differential Hall elements facing one another in the same direction (i.e., index 306 is facing in while index 322 is facing out). (IC package 104 of FIG. 1 is rotated 180 degrees to result in the IC package 304 of FIG. 3.) Configuration 300 thus includes a differential Hall IC package 302 and a differential Hall IC package 304. Differential Hall IC package 302 includes differential Hall elements 308 and 310, while differential Hall IC package 304 includes differential Hall elements 318 and 320. Differential Hall elements 308 and 318 generally comprise differential Hall elements, which can be designated "Hall1." Differential Hall elements 310 and 320 generally comprise differential Hall elements, which can be designated "Hall2". Differential Hall IC packages 302 and 304 are thus located next to one another in the same direction, which means that differential Hall elements 308, 310 are respectively located in the same direction as differential Hall elements 318, 320. Note that differential hall elements 308, 310, 318 and 320 can also be referred to as magnetic Hall elements. Thus, based on the foregoing, a differential Hall analog output signal can be determined by the formulation, Hall2-Hall1.

Figure 4:
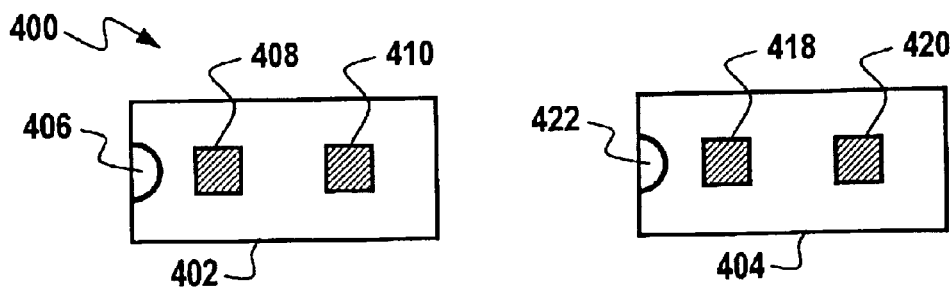
FIG. 4 depicts a block diagram illustrating an alternative configuration of differential Hall elements facing one another in the same direction.

FIG. 4 depicts a block diagram illustrating an alternative configuration 400 of differential Hall elements facing one another in the same direction (i.e., index 406 is facing out while index 422 is facing in). (IC package 102 of FIG. 1 is rotated 180 degrees to result in the IC package 304 of FIG. 3.) Configuration 400 thus includes a differential Hall IC package 402 and a differential Hall IC package 404. Differential Hall IC package 402 includes differential Hall elements 408 and 410, while differential Hall IC package 404 includes differential Hall elements 418 and 420. Differential Hall elements 410 and 420 generally comprise differential Hall elements, which can be designated "Hall1." Differential Hall elements 408 and 418 generally comprise differential Hall elements, which can be designated "Hall2". Differential Hall IC packages 402 and 404 are thus located next to one another in the same direction, which means that differential Hall elements 408, 410 are respectively located in the same direction as differential Hall elements 418, 420. Note that differential hall elements 408, 410, 418 and 420 can also be referred to as magnetic Hall elements. Thus, based on the foregoing, a differential Hall analog output signal can be determined by the formulation, Hall2-Hall1.

Figure 5:
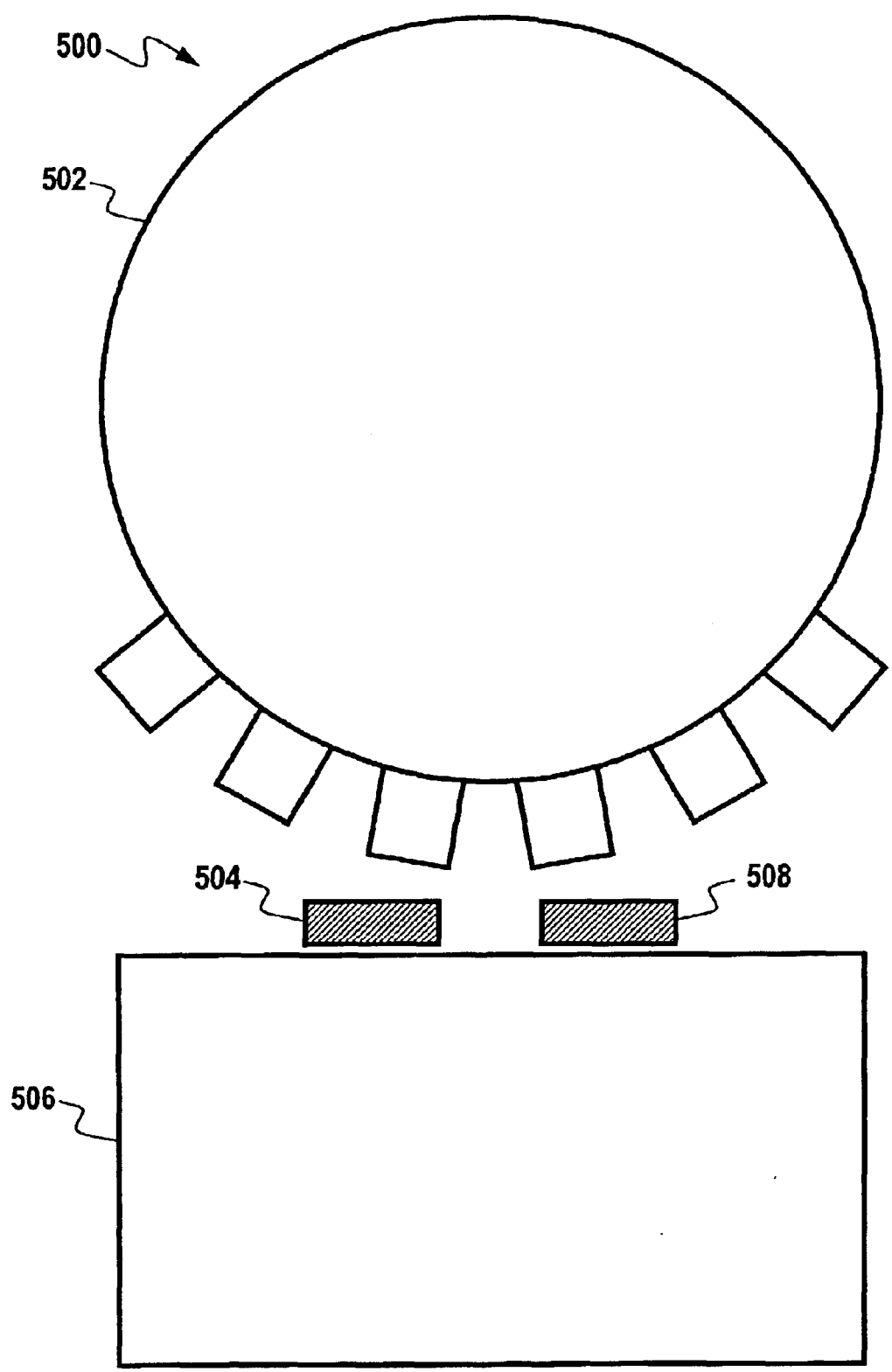
FIG. 5 depicts a block diagram illustrating a differential Hall sensor configuration and a target thereof, in accordance with a preferred embodiment of the present invention.

FIG. 5 depicts a block diagram illustrating a differential Hall sensor configuration 500 and a target 502 thereof, in accordance with a preferred embodiment of the present invention. As indicated in configuration 500, differential Hall IC packages 504 and 508 are generally located in the vicinity of and/or may be integrated with a sensor 506. Differential Hall IC package 504 is generally analogous to differential Hall IC package 102 of FIG.1 and differential Hall IC package 202 of FIG. 2. Similarly, differential Hall IC package 508 is generally analogous to differential Hall IC package 104 of FIG. 1 and differential Hall IC package 204 of FIG. 2. Preferably, differential Hall IC packages 504 and 508 are located opposite one another. Each IC package 504 and 508 includes two differential Hall elements, similar to the configurations 100 and 200 described and illustrated herein with respect to FIGS. 1 and 2.

Figure 6:
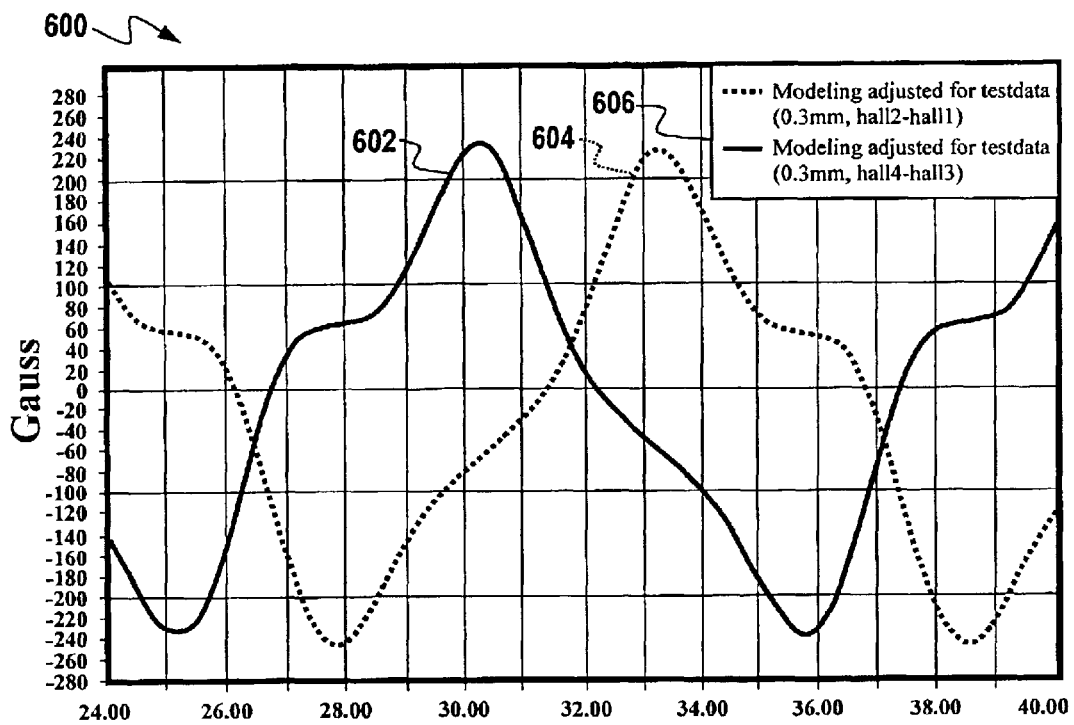
FIG. 6 depicts a graph illustrating analog curve modeling of target rotation with ICs facing opposition directions, in accordance with a preferred embodiment of the present invention.

FIG. 6 illustrates a graph 600 illustrating analog curve modeling of target rotation with ICs facing opposition directions, in accordance with a preferred embodiment of the present invention. Block 606 of FIG. 6 indicates that modeling is adjusted for particular test data. Lines 602 (Hall4-Hall3) and 604 (Hall2-Hall1) of FIG. 6 indicate a range of test data results. The data collected to develop graph 600 is based on differential Hall IC packages facing opposite directions, wherein modeling signal sizes are adjusted for test data results. Thus, as indicated by graph 600, symmetry provides stability for accurate phasing, based on opposing IC packages. Note that graph 600 of FIG. 6 is not considered a limiting feature of the present invention but is depicted herein for illustrative and edification purposes only. Note also that modeling signal shapes are typically very accurate, but the amplitudes can vary depending on the magnetic circuit utilized. Test data is utilized to scale the modeling to best represent a "real" sensor. Those skilled in the art can, of course, appreciate that graph 600 is presented for illustrative and edification purposes only and is not considered a limiting feature of the present invention.

Figure 7:
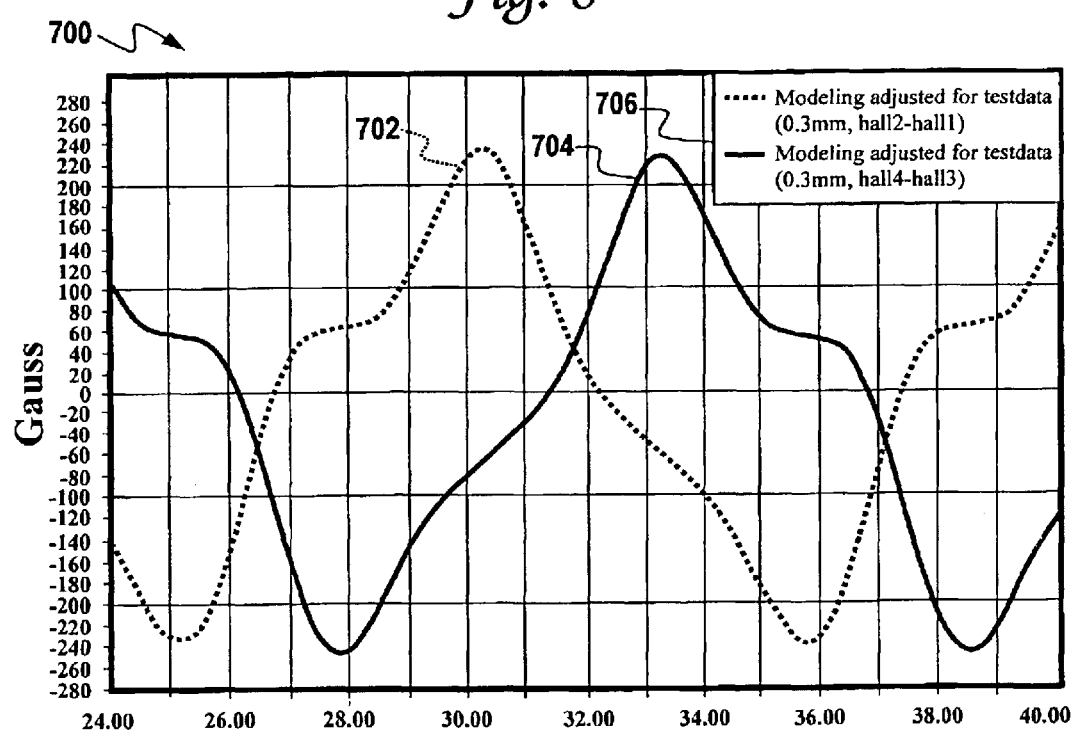
FIG. 7 depicts a graph illustrating analog curve modeling of target rotation with ICs facing opposition directions, in accordance with an alternative embodiment of the present invention.

FIG. 7 depicts a graph 700 illustrating analog curve modeling of target rotation with ICs facing opposite directions, in accordance with an alternative embodiment of the present invention. As indicated at block 706, modeling test data is adjusted for the formulation Hall2-Hall1 and for Hall4-Hall3, as respectively indicated by lines 702 (Hall2-Hall1) and 704 (Hall4-Hall3). Note that graph 700 of FIG. 7 is not considered a limiting feature of the present invention but is depicted herein for illustrative and edification purposes only.

Figure 8:
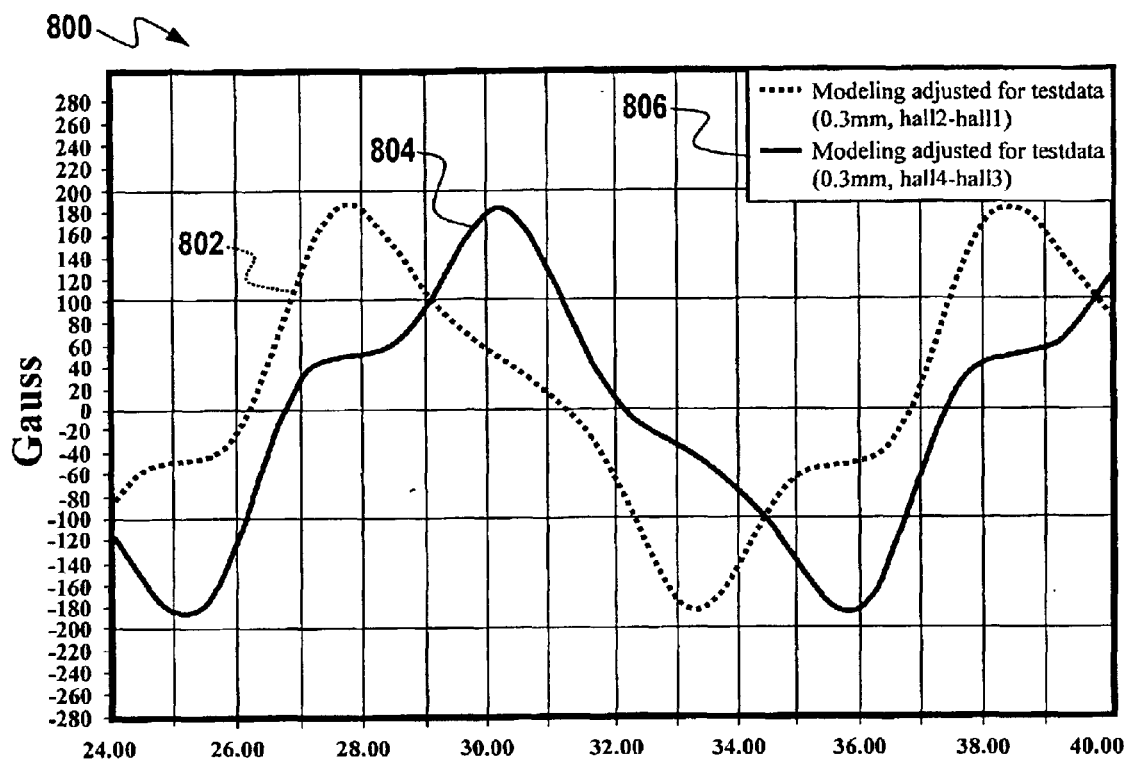
FIG. 8 depicts a graph illustrating analog curve modeling of target rotation with ICs facing one another in the same direction.

FIG. 8 illustrates a graph 800 illustrating analog curve modeling of target rotation with ICs facing one another in the same direction. As indicated at block 806, test data is adjusted for the formulation Hall2-Hall1 and Hall4-Hall3 as respectively indicated by lines 802 (Hall2-Hall1) and 804 (Hall4-Hall3). Those skilled in the art can appreciate based on graph 800 that a lack of analog curve symmetry provides instability for accurate phasing. Note that graph 800 of FIG. 8 is not considered a limiting feature of the present invention but is depicted herein for illustrative and edification purposes only.

Figure 9:
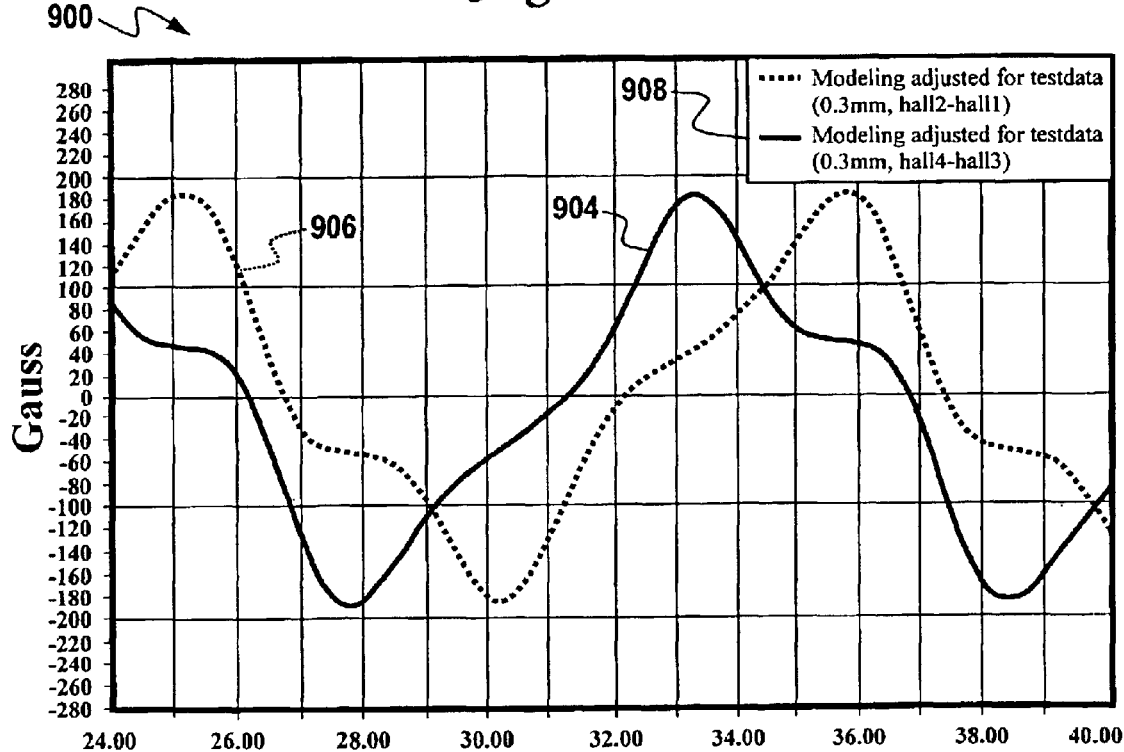
FIG. 9 depicts an alternative graph illustrating analog curve modeling of target rotation with ICs facing one another in the same direction.

FIG. 9 depicts an alternative graph 900 illustrating analog curve modeling of target rotation with ICs facing one another in the same direction. As indicated at block 908, test data is adjusted for the formulation Hall4-Hall3 and Hall2-Hall1 as respectively indicated by lines 904 (Hall4-Hall3) and 906 (Hall2-Hall1). Those skilled in the art can appreciate based on graph 900 that a lack of analog curve symmetry provides instability for accurate phasing. Note that graph 900 of FIG. 8 is not considered a limiting feature of the present invention but is depicted herein for illustrative and edification purposes only.

Figure 10:
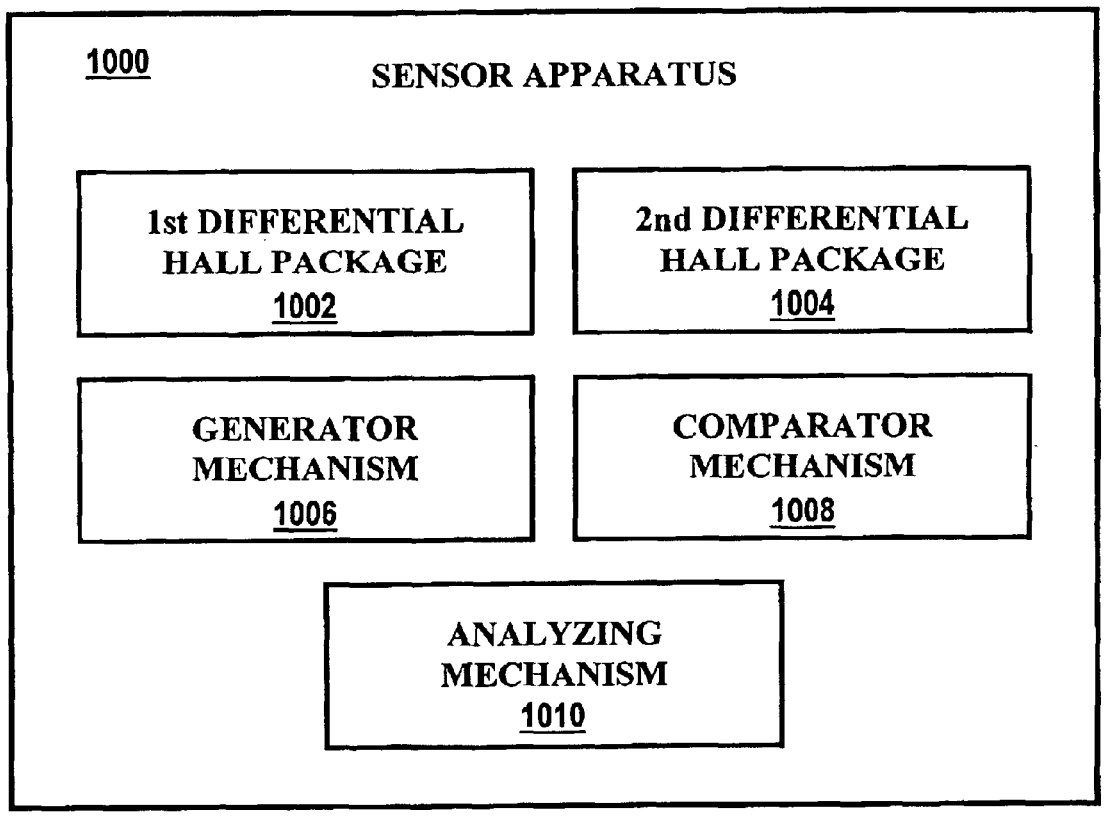
FIG. 10 depicts a high-level block diagram illustrating blocks representative of elements and mechanisms, which may be utilized to implement a sensor apparatus, in accordance with a preferred embodiment of the present invention.

FIG. 10 illustrates a high-level block diagram illustrating blocks representative of elements and mechanisms, which may be utilized to implement a sensor apparatus 1000, in accordance with a preferred embodiment of the present invention. Sensor apparatus 1000 thus can be implemented to sense the speed and direction of a rotating target, such as target 502 illustrated in FIG. 5. Sensor apparatus 1000 generally includes a first differential Hall package 1002, which is located opposite to a second differential Hall package 1004, wherein first differential Hall package 1002 and second differential Hall package 1004 comprise mirror and opposite images of one another. First and second differential Hall packages 1002 and 1004 generally can be differential Hall IC packages. First differential Hall package 1002 can be configured as a single IC package composed of two magnetic Hall elements, such as, for example, differential Hall elements 108 and 110 depicted in FIG. 1. Similarly, second differential Hall IC package 1004 can be configured as a single IC package composed of two magnetic Hall elements, such as, for example, differential magnetic Hall elements 120 and 118 illustrated in FIG. 1.

Additionally, sensor apparatus 1000 can include a generator mechanism 1006 for generating a first output signal from first differential Hall package 1002 and a second output signal from second differential Hall package 1004 during a rotation of a rotating target such as, for example, target 502 depicted in FIG. 5. Sensor apparatus 1000 also can include a comparator mechanism 1008 for comparing the first Hall output signal to the second Hall output signal during a shift of the rotating target (e.g., target 502 of FIG. 5) from a sinusoidal phase to a non-sinusoidal phase thereof, thereby permitting accurate phase information indicative of the speed and direction of the rotating target to be obtained. Finally, sensor apparatus 1000 may include an analyzing mechanism 1010 for analyzing particular target features associated with a phase of the rotating target, wherein such target features are wide with respect to an associated target-to-sensing plane and a sensing plane-to-magnet distance.

It is important to note that although the various components of sensor apparatus 1000 are depicted within sensor apparatus 1000, it can be appreciated by those skilled in the art that such components may also be configured external to sensor apparatus 1000. FIG. 10 represents merely one possible embodiment out of a variety of potential embodiments of the present invention. For example, comparator mechanism 1008 and analyzing mechanism 1010 can be located external to sensor apparatus 1000, rather than within a single sensor apparatus package. Note that in general, a 90 degree phase angle is an important parameter when comparing two signals and analyzing which signal leads or lags the other. Typically, if electronic components are located within the sensor to perform comparing and analyzing functions, tolerances for phase errors can be much greater (e.g., 45 to 135 degrees). By reducing any phase errors, however, large design margins are permitted within the sensor design, thereby permitting more robust and hopefully less complicated circuits to be implemented.

Based on the foregoing it can be appreciated that the present invention thus generally discloses and describes a method and apparatus for sensing the speed and direction of a rotating target. A method and apparatus for sensing the speed and direction of a rotating target are disclosed herein. A first differential Hall package is generally located opposite a second differential Hall package, wherein the first differential Hall package and second differential Hall package comprise mirror images of one another. The first differential Hall package generally includes two or more magnetic Hall elements. The second differential Hall package also generally includes two or more magnetic Hall elements. Such magnetic Hall elements can be differential Hall elements. A first output signal can then be generated by the first differential Hall package and a second output signal by the second differential Hall package during a rotation of the rotating target. The first Hall output signal can thus be compared to the second Hall output signal during a shift of the rotating target from a sinusoidal phase to a non-sinusoidal phase thereof, thereby permitting accurate phase information indicative of the speed and direction of the rotating target to be obtained.

The present invention disclosed and described herein thus comprises a speed and direction sensor that generally utilizes two separate differential Hall ICs. An initial phase can be established by the distances between each of the ICs as a function of the target and magnet placements thereof. Differential Hall analog signals become non-sinusoidal as target features increase. Changing the target rotation direction causes large errors in signal phasing when comparing dual differential Hall digital outputs because of the non-symmetry of the analog signals. To eliminate the large resulting error, IC placement relative to one another is thus critical. By placing the ICs in opposite directions relative to each other, the associated phase remains unaffected by the target rotation. If both ICs are placed in the same direction, however, a large phase shift will be seen when the target rotation is varied.

The method and apparatus for placing differential Hall elements next to one another as described herein thus becomes beneficial when the Hall output (i.e., analog signal) begins to alter from a perfect sinusoidal signal. When target features are wide, for example, with respect to the target-to-sensing plane and the sensing plane-to-magnet distances, the Hall signal tends to posses areas of "leveling off" or an area of decreased slope. This area greatly impacts the manner in which the two signals optimally can be compared to one another to achieve the most accurate phase information between target rotations. The sensor method and apparatus thus disclosed herein can be utilized for any application where target direction is required, thereby yielding the best signals.

The present invention can be modified such that a ring magnet is utilized in place of a ferrous target wheel. In such a case, the differential Hall ICs would not be back biased with a magnet (i.e., a magnet would not be located behind the ICs). Such a configuration could provide two different systems. First, the two differential hall ICs would face opposite directions and would contain magnets located behind the IC (i.e., back biased) sensing a ferrous target. Second, the two differential hall ICs would face opposite directions without magnets located behind the IC, thereby sensing a ring magnet.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. For example, it can be appreciated by those skilled in the art that the present invention described herein can apply to automotive sensor applications. The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

The embodiments of an invention in which an exclusive property or right is claimed are defined as follows:

1. A method for sensing the speed and/or direction of a rotating target, said method comprising the steps of:

locating a first differential Hall package opposite to a second differential Hall package to provide symmetrical stability for accurate phasing thereof, wherein said first differential Hall package and second differential Hall package comprise mirror images of one another;

generating a first output signal by said first differential Hall package and a second output signal by said second differential Hall package during a rotation of a rotating target;

comparing said first Hall output signal to said second Hall output signal during a shift of said rotating target from a sinusoidal phase to a non-sinusoidal phase thereof, thereby permitting accurate phase information indicative of the speed and direction of said rotating target to be obtained; and analyzing particular target features associated with a phase of said rotating target, wherein said particular target features are wide with respect to an associated target-to-sensing plane and a sensing plane-to-magnet distance.

2. The method of claim 1 further comprising the steps of:
configuring said first differential Hall package to comprise at least two magnetic Hall elements; and
configuring said second differential Hall package to comprise at least two magnetic Hall elements.

3. The method of claim 1 wherein the step of generating a first output signal by said first differential Hall package and a second output signal by said second differential Hall package during a rotation of a rotating target, further comprises the step of:
generating said first and second output signals, wherein said first and second output signals comprise analog signals.

4. The method of claim 1 further comprising the steps of:
configuring said first differential Hall package as a differential Hall integrated circuit package; and
configuring said second differential Hall package as a differential Hall integrated circuit package.

5. The method of claim 1 wherein the step of locating a first differential Hall package opposite to a second differential Hall package, wherein said first differential Hall package and second differential Hall package comprise mirror images of one another, further comprises the step of:
locating said first differential Hall package beside said second differential Hall package, such that a distance exists between said first and second differential Hall packages.

6. The method of claim 5 further comprising the step of:
establishing an initial phase associated with said rotating target based on said distance between said first and second differential Hall packages.

7. The method of claim 1 further comprising the step of:
determining a direction of said rotating system by comparing said first output signal to said second output signal and determining which of said first or second output signals leads the other.

8. The method of claim 1 further comprising the step of:
determining a direction of said rotating system by comparing said first output signal to said second output signal and determining which of said first or second output signals lags the other.

9. The method of claim 1 further comprising the step of:
determining a speed of said rotating system by monitoring a pulse width associated with at least one of said first or second output signals.

10. The method of claim 1 further comprising the step of:
determining a speed of said rotating system by monitoring a period width associated with at least one of said first or second output signals.

11. A method for sensing the speed and/or direction of a rotating target, said method comprising the steps of:

locating a differential Hall package opposite to a second differential Hall package, wherein said first differential Hall package and said second differential Hall package comprise mirror images of one another;

configuring said first differential Hall package to comprise at least two magnetic Hall elements;

configuring said second differential Hall package to comprise at least two magnetic Hall elements;

generating a first output signal by said first differential Hall package and a second output signal by said second differential Hall package during a rotation of a rotating target, wherein said first and second output signals comprise analog signals;

comparing said first Hall output signal to said second Hall output signal during a shift of said rotating target from a sinusoidal phase to a non-sinusoidal phase thereof; and analyzing particular target features associated with a phase of said rotating target, wherein said particular target features are wide with respect to an associated target-to-sensing plane and a sensing plane-to-magnet distance, thereby permitting accurate phase information indicative of the speed and direction of said rotating target to be obtained.

12. An apparatus for sensing the speed and/or direction of a rotating target, said apparatus comprising:

a first differential Hall package located opposite to a second differential Hall package to provide symmetric stability for accurate phasing thereof, wherein said first differential Hall package and second differential Hall package comprise mirror images of one another;

a generator mechanism for generating a first output signal by said first differential Hall package and a second output signal by said second differential Hall package during a rotation of a rotating target;

a comparator mechanism for comparing said first Hall output signal to said second Hall output signal during a shift of said rotating target from a sinusoidal phase to a non-sinusoidal phase thereof, thereby permitting accurate phase information indicative of the speed and direction of said rotating target to be obtained; and analyzing mechanism for analyzing particular target features associated with a phase of said rotating target, wherein said particular target features associated with said phase of said rotating target are analyzed when said particular target features are wide with respect to an associated target-to-sensing plane and a sensing plane-to-magnet distance.

13. The apparatus of claim 12 wherein:
said first differential Hall package comprises at least two magnetic Hall elements; and
said second differential Hall package comprises at least two magnetic Hall elements.

14. The apparatus of claim 12 wherein said first and second output signals comprise analog signals.

15. The apparatus of claim 12 wherein:
said first differential Hall package comprises a differential Hall integrated circuit; and
said second differential Hall package comprises differential Hall integrated circuit.

16. The apparatus of claim 12 wherein said first differential Hall package is located beside said second differential Hall package, such that a distance exists between said first and second differential Hall packages.

17. The apparatus of claim 16 wherein an initial phase associated with said rotating target is based on said distance between said first and second differential Hall packages.

18. The apparatus of claim 12 wherein a direction of said rotating system is determined by comparing said first output signal to said second output signal and determining which of said first or second output signals leads the other.

19. The apparatus of claim 12 wherein a direction of said rotating system is determined by comparing said first output signal to said second output signal and determining which of said first or second output signals lags the other.

20. The apparatus of claim 12 wherein a speed of said rotating system is determined by monitoring a pulse width associated with at least one of said first or second output signals.

21. The apparatus of claim 12 wherein a speed of said rotating system is determined by monitoring a period width associated with at least one of said first or second output signals.

22. An apparatus for sensing the speed and direction of a rotating target, said apparatus comprising:
a first differential Hall package located opposite to a second differential Hall package, wherein said first differential Hall package and said second differential Hall package comprise mirror images of one another;
said first differential Hall package comprising at least two magnetic Hall elements;
said second differential Hall package comprising at least two magnetic Hall elements;
generator mechanism or generating a first output signal by said first differential Hall package and second output signal by said second differential Hall package during a rotation of a rotating target, wherein said first and second output signals comprise analog signals;
comparator mechanism for comparing said first Hall output signal to said second Hall output signal during a shift of said rotating target from a sinusoidal phase to a non-sinusoidal phase thereof; and
analyzing mechanism for analyzing particular target features associated with a phase of said rotating target, wherein said particular target features are wide with respect to an associated target-to-sensing plane and a sensing pLane-to-magnet distance, thereby permitting accurate phase information indicative of the speed and direction of said rotating target to be obtained.

* * * * *